US011252239B2

(12) United States Patent
Pak et al.

(10) Patent No.: US 11,252,239 B2
(45) Date of Patent: Feb. 15, 2022

(54) ENABLING COMMUNICATIONS BETWEEN DEVICES

(71) Applicants: Arm IP Limited, Cambridge (GB); Arm Limited, Cambridge (GB)

(72) Inventors: Yongbeom Pak, Oulu (FI); Hannes Tschofenig, Tirol (AT)

(73) Assignees: Arm IP Limited, Cambridge (GB); Arm Limited, Cambridge (GB)

( * ) Notice: Subject to any disclaimer, the term of this patent is extended or adjusted under 35 U.S.C. 154(b) by 119 days.

(21) Appl. No.: 15/842,705

(22) Filed: Dec. 14, 2017

(65) Prior Publication Data
US 2018/0213040 A1 Jul. 26, 2018

(30) Foreign Application Priority Data
Dec. 15, 2016 (GB) ..................................... 1621327

(51) Int. Cl.
*H04L 29/08* (2006.01)
*H04L 29/06* (2006.01)
(Continued)

(52) U.S. Cl.
CPC .......... *H04L 67/141* (2013.01); *H04L 9/3268* (2013.01); *H04L 63/0823* (2013.01);
(Continued)

(58) Field of Classification Search
CPC ... H04L 67/141; H04L 63/168; H04L 9/3268; H04L 67/12
See application file for complete search history.

(56) References Cited

U.S. PATENT DOCUMENTS

| 8,868,698 B2 | 10/2014 | Millington et al. |
| 8,943,323 B2 | 1/2015 | Brown et al. |

(Continued)

FOREIGN PATENT DOCUMENTS

| CN | 104662871 A | 5/2015 |
| EP | 2819342 A1 | 12/2014 |
| GB | 2529838 A | 3/2016 |

OTHER PUBLICATIONS

UKIPO Examination and Search Report; GB 1621327.4; dated Jun. 8, 2017.

(Continued)

*Primary Examiner* — Rupal Dharia
*Assistant Examiner* — Steven C Nguyen
(74) *Attorney, Agent, or Firm* — Pramudji Law Group PLLC; Ari Pramudji

(57) ABSTRACT

A method of establishing a communications path between devices comprising: receiving, at a first device, data, the data comprising: a first resource having a first identifier for a second device remote from the first device; a second resource having a second identifier for the second device; addressing the second device with the first identifier; generating, at the first device, first connection data based on the second identifier; transmitting, from the first device to the second device, the first connection data; receiving, at the first device, second connection data; validating, at the first device, the second connection data; establishing the communications path between the first device and second device responsive to valid second connection data.

19 Claims, 10 Drawing Sheets

(51) Int. Cl.
*H04L 9/32* (2006.01)
*H04W 12/069* (2021.01)
*H04W 12/0431* (2021.01)

(52) U.S. Cl.
CPC .......... *H04L 63/166* (2013.01); *H04L 63/168* (2013.01); *H04W 12/0431* (2021.01); *H04W 12/069* (2021.01); *H04L 67/12* (2013.01)

(56) References Cited

U.S. PATENT DOCUMENTS

| | | |
|---|---|---|
| 9,445,270 B1 | 9/2016 | Bicket et al. |
| 10,033,719 B1 * | 7/2018 | Baranowski ........ H04L 63/0823 |
| 2005/0246548 A1 * | 11/2005 | Laitinen .................. H04L 63/08 |
| | | 713/182 |
| 2015/0033312 A1 * | 1/2015 | Seed ....................... H04W 4/70 |
| | | 726/7 |
| 2016/0234683 A1 * | 8/2016 | Bone ................. H04W 52/0229 |
| 2016/0294819 A1 * | 10/2016 | Salmela ................ H04W 12/04 |

OTHER PUBLICATIONS

CN 201711343356.5; CNIPA Office Action/Examination Report; dated Oct. 28, 2021.

Lightweight Machine to Machine Technical Specification; Candidate Version 1.0; Open Mobile Alliance; Apr. 7, 2016.

Intellectual Property India; Office Action/Examination Report; IN 201714043941; dated Dec. 10, 2021.

* cited by examiner

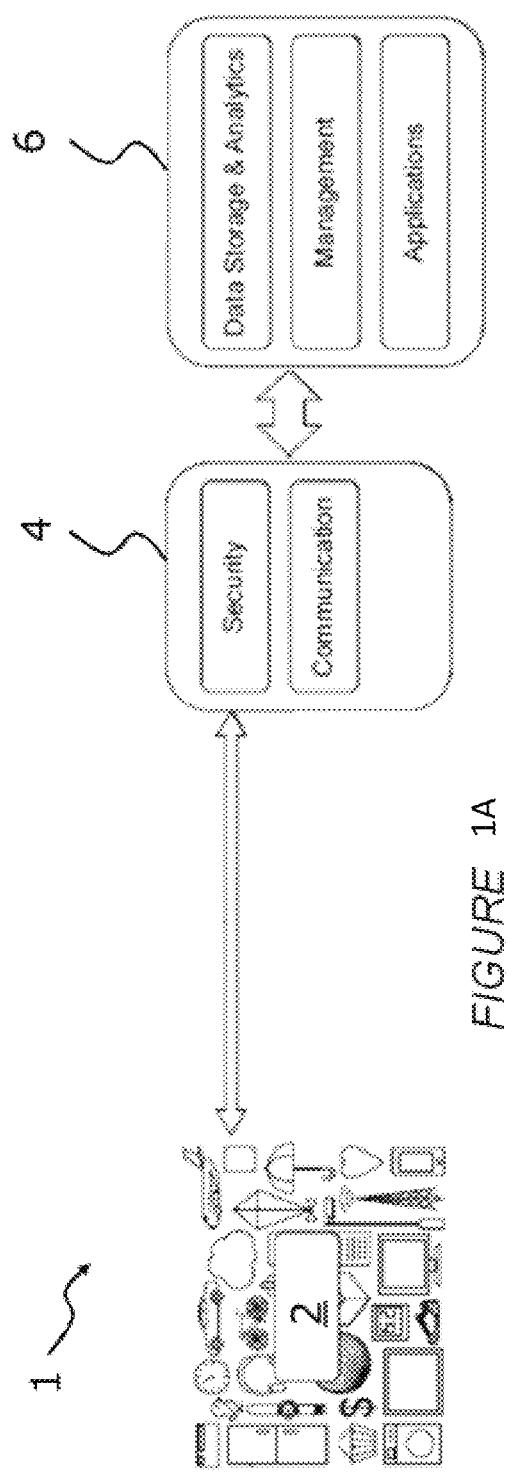
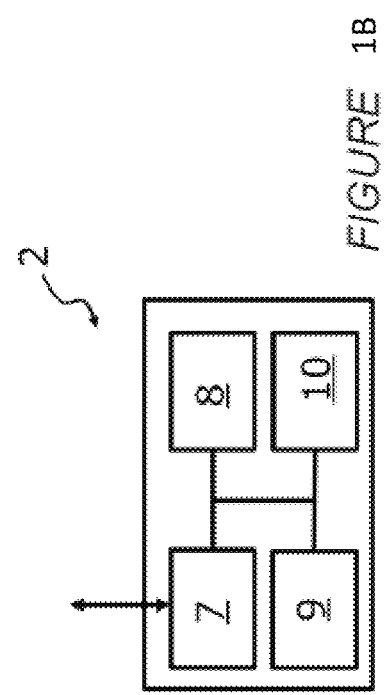
FIGURE 1A
FIGURE 1B

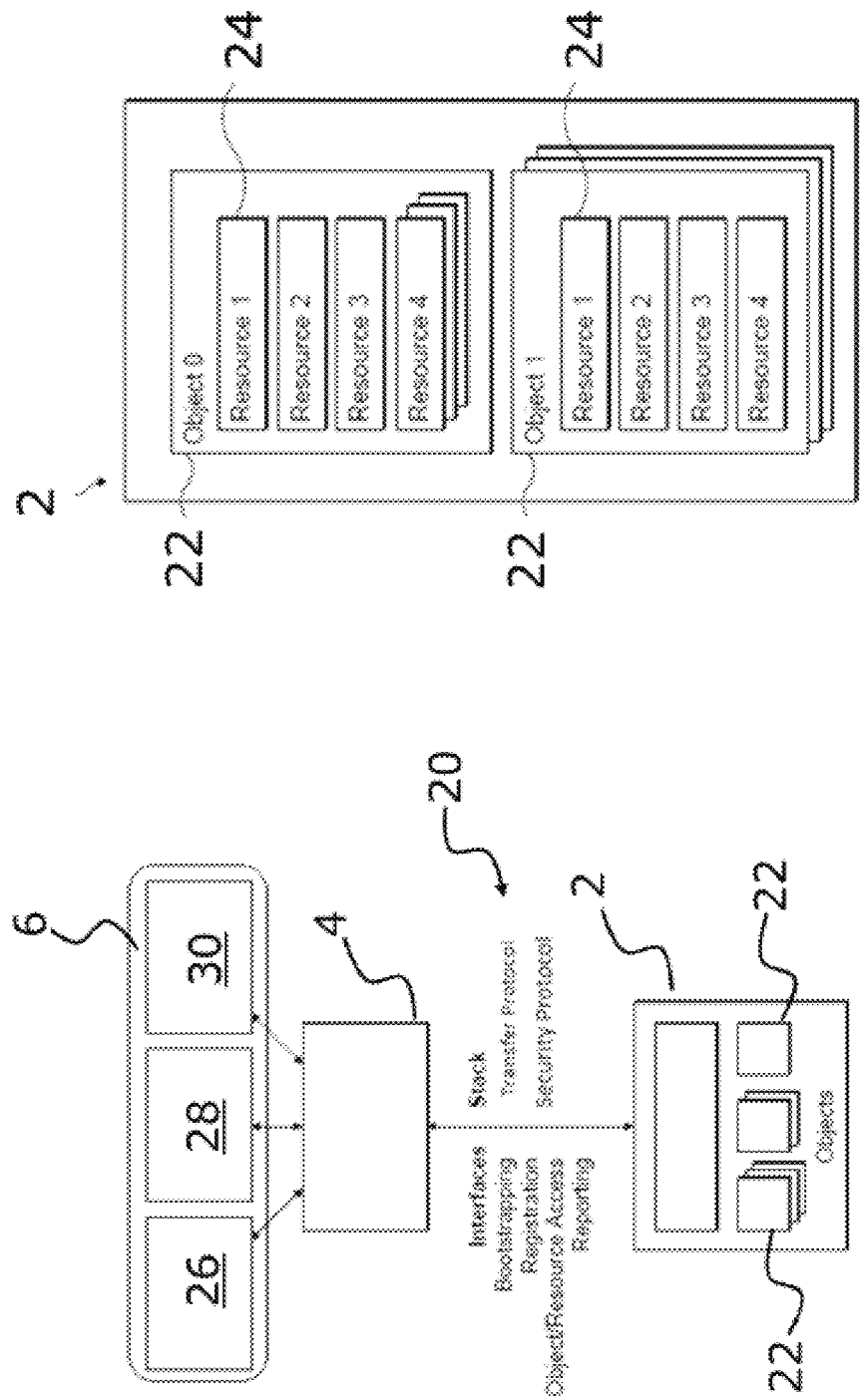

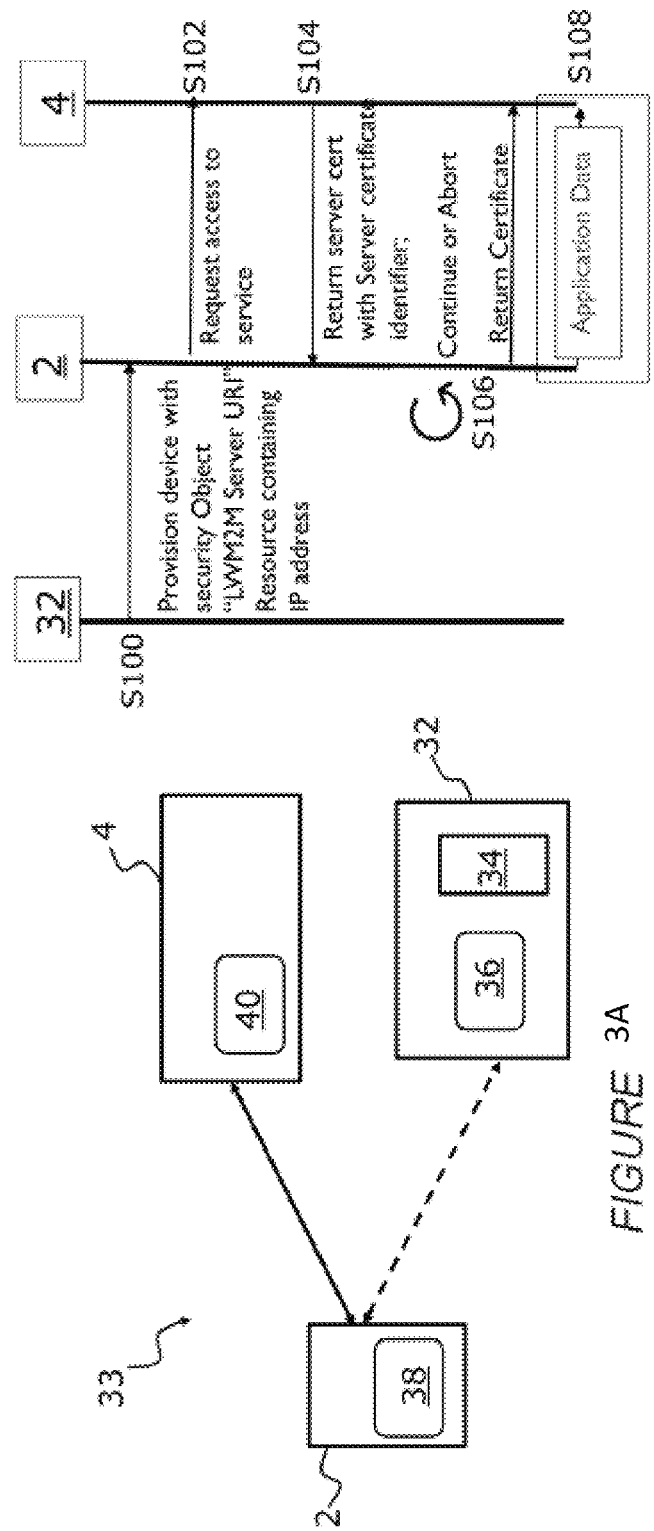

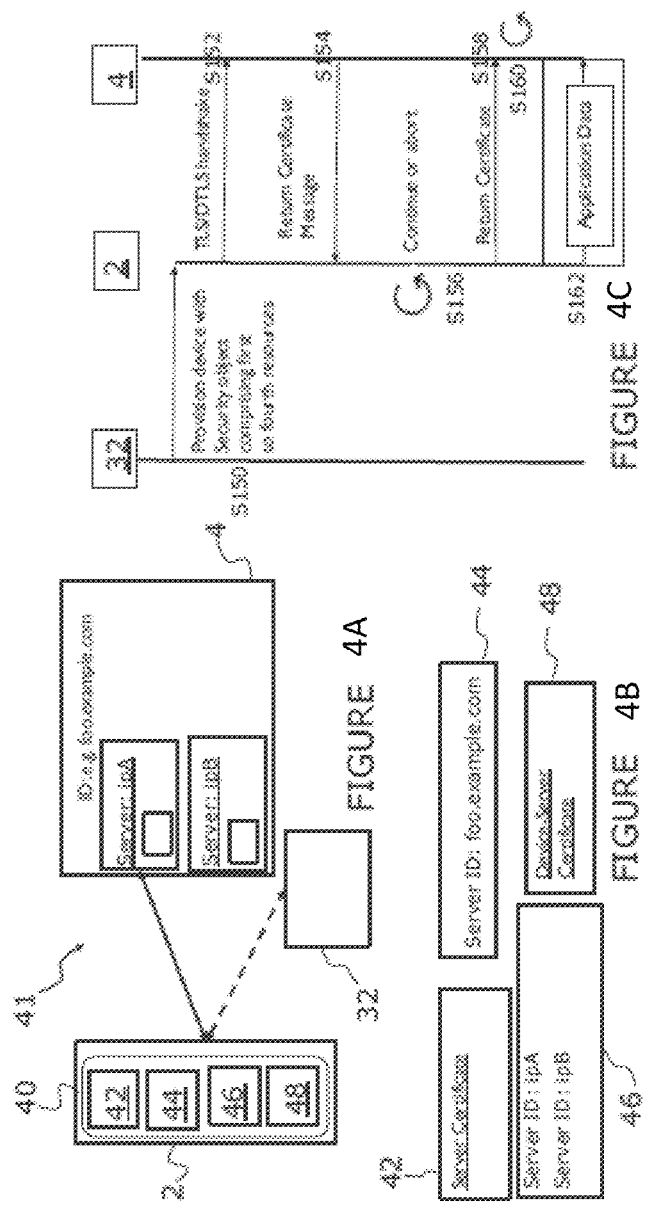

ENABLING COMMUNICATIONS BETWEEN DEVICES

This application claims priority to GB Application Number 1621327.4, filed Dec. 15, 2016, the entire contents of which are hereby incorporated by reference in this application.

The present techniques generally relate to methods, apparatuses and systems for enabling communications between devices.

There are ever increasing numbers of devices within the home, other buildings or the outdoor environment that have processing and communication capabilities which allow them to communicate with other devices (e.g. end-point devices, servers) within the same network or on a different network (e.g. on the internet) to access services as part of the "Internet of Things".

For example, a temperature device in the home may gather sensed data and push the sensed data to a remote service (such as an application running on the cloud). The temperature device may then be controlled remotely by the remote service via received command data. In other examples, a factory pollution monitoring sensor may gather information from various chemical sensors and arrange maintenance based on the gathered information; whilst a healthcare provider may use wireless sensors, such as a heart rate monitor to track the health of patients while they are at home.

Such devices are used in myriad networks, whereby the data is generally transmitted between devices and/or services using machine-to-machine (M2M) communication techniques.

Such devices are provisioned with a security certificate which includes an internet protocol (IP) address of the server the device needs to communicate with. However, as IP addresses change, (e.g. due to IP reassignments, network provider switching, multi-homing, or load balancing), a device relying on the IP addresses to connect to another device would require re-provisioning of security certificates with updated IP addresses. This may be inconvenient, may incur costs and will take time.

The present techniques seek to address the aforementioned problems.

According to a first technique there is provided a method of establishing a communications path between devices comprising: receiving, at a first device, data, the data comprising: a first resource having a first identifier for a second device remote from the first device; a second resource having a second identifier for the second device; addressing the second device with the first identifier; generating, at the first device, first connection data based on the second identifier; transmitting, from the first device to the second device, the first connection data; receiving, at the first device from the second device, second connection data; validating, at the first device, the second connection data; establishing the communications path between the first device and second device responsive to valid second connection data.

According to a further technique there is provided a method of provisioning data on a first device by a bootstrap device, the method comprising: establishing a communication path from the bootstrap device to the first device; transmitting, from the bootstrap device to the first device, data based on which the first device can establish a communications path with a second device, the data comprising: a first resource having a first identifier based on which the first device can address the second device; a second resource having a second identifier based on which the first device can generate connection data for the second device; a third resource having a third identifier based on which the first device can validate connection data from the second device.

According to a further technique there is provided a device comprising: storage configured to store: a first resource having a first identifier for identifying a remote device; a second resource having a second identifier for identifying the remote device; processing circuitry configured to generate first connection data based on the second identifier; communication circuitry for addressing the remote device with the first identifier and transmitting the first connection data to the remote device and for receiving second connection data from the remote device; wherein the processing circuitry is further configured to validate the second connection data and establish a communication path with the remote device responsive to a valid second connection data.

According to a further technique there is provided an apparatus for provisioning data on a device, the apparatus comprising: storage configured to store resources for one or more devices remote therefrom; communication circuitry configured to receive a bootstrap request from a first device, the bootstrap request including an identifier for the first device; processing circuitry configured to process the bootstrap request and determine the resources to be sent to the first device based on the identifier for the first device, and transmitting the resources to the first device, wherein the resources comprise a first resource having a first identifier for identifying a second device with which the first device can address the second device, a second resource having a second identifier for the second device, and a third resource having a third identifier for the second device based on which the first device can generate connection data for the second device and a third resource having a third identifier based on which the first device can validate communications from the second device.

According to a further technique there is provided a system comprising: an apparatus for provisioning data on a device; a first device; a second device to which the first device is to connect to access a service; wherein the apparatus is configured to provision the first resource, second resource and third resource on the first device in response to a bootstrap request for the first device; and wherein the first device is configured to: address the second device with the first identifier; generate first connection data based on the second identifier; transmit, to the second device, the first connection data; receive, from the second device, second connection data; validate, the second connection data; and establish a communications path with the second device responsive to valid second connection data.

The techniques are diagrammatically illustrated, by way of example, in the accompanying drawings, in which:

FIG. 1A shows a deployment scenario for a plurality of devices requiring access to one or more services according to an embodiment;

FIG. 1B shows a schematic illustration of a device of FIG. 1A according to an embodiment;

FIG. 2A shows an architecture for communications between a device of FIG. 1A and a server according to an embodiment;

FIG. 2B shows objects/resources provided in the device of FIG. 2A;

FIG. 3A shows a deployment scenario whereby the device of FIG. 2A is in communication range of the server and the bootstrap server according to an example;

FIG. 3B shows a communication sequence between the bootstrap server, device and server of FIG. 3A;

FIG. 4A shows a system having the device of FIG. 2A in communication with a server and the bootstrap server according to an embodiment;

FIG. 4B shows different resources provisioned on the device of FIG. 4A;

FIG. 4C shows a communication sequence between the bootstrap server, device and server of FIG. 4A;

Figure 5A:
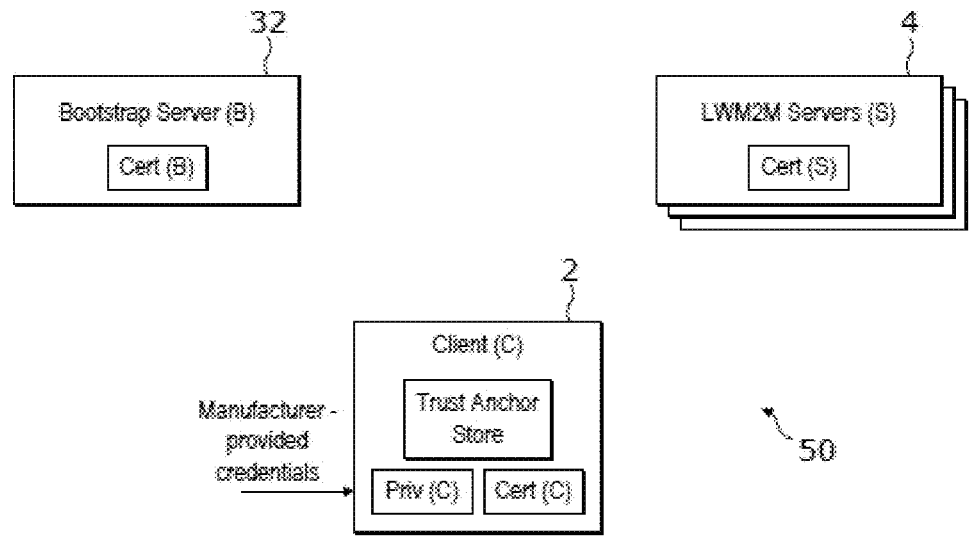
FIG. 5A, FIG. 5B, FIG. 5C and FIG. 5D show a system having the device of FIG. 2A communicating with a server and bootstrap server according to an embodiment.

FIG. 1A shows a deployment scenario 1 for a plurality of devices 2, requiring access to one or more services communicating with the server 4, and FIG. 1B illustrates a device 2 according to an example.

Devices 2 may be a computer terminal, a laptop, a tablet or mobile-phone, or may, for example, be a lightweight machine to machine (LWM2M) device used to turn objects into "smart-objects" such as streetlights, electric meters, temperature sensors and building automation as part of the IoT, and a range of devices are illustratively depicted in FIG. 1A. It will be appreciated that the depictions of devices 2 shown in FIG. 1A are for illustrative purposes only and FIG. 1A does not show an exhaustive list of such devices.

FIG. 1B schematically, whereby the device 2 comprises communication circuitry 7 for communicating with remote devices such as the server 4 (FIG. 1A).

The communication circuitry 7 may use a wireless communication, such as communication using wireless local area network (Wi-Fi®), short range communication such as radio frequency communication (RFID) or near field communication (NFC), or communications used in wireless technologies such as ZigBee®, Thread®, Bluetooth®, Bluetooth® LE, IPv6 over Low Power Wireless Standard (6LoWPAN) or Constrained Application Protocol (CoAP). Also, the communication circuitry may use a cellular network such as 3G or 4G. The communication circuitry may also use wired communication such as using a fibre optic or metal cable. The communication circuitry could also use two or more different forms of communication, such as several of the examples given above in combination.

The device 2 further comprises processing circuitry 8 for controlling various processing operations performed by the device 2, such as validation of connection data from a remote device and generating connection data at the device 2 for transmission to a remote device.

The device 2 further comprises storage 9 for storing data and information, whereby the storage circuitry 9 may comprise volatile and/or volatile memory.

The device 2 further comprises input/output circuitry 10, such that the device can receive inputs (e.g. sensor inputs, measurement inputs etc.) and or generate outputs (e.g. audio/visual/control commands etc.).

The server 4 may be any device capable of providing server functionality for another device, for example to provide access to a service 6 with which it communicates or hosts, and may, for example, be a gateway device in a home, an edge server, a computer terminal, a laptop, a tablet or mobile-phone, or may, for example, be a device used to turn objects into "smart-objects".

The devices 2 communicates with server 4 using appropriate standards or protocols such as open IETF standards including over a first network, such as, for example, a low-power wireless network using (6LoWPAN), although any suitable network may be used. It will be appreciated that intermediary devices, such as a gateway device, may be located between the devices 2 and server 4.

The server 4 communicates with services 6, which may, for example, be part of a private cloud or public cloud environment on the internet or which may be hosted on the server, and which may provide different types of services such as data storage & analytics services, management services and application services, although this list is not exhaustive.

FIG. 2A illustratively shows an architecture 20, which in the present illustrative example is a LWM2M architecture 20, for providing a secure communications path or channel between device 2 and the server 4, which in the present illustrative example is an LWM2M server 4.

Logical interfaces between the device 2 and server 4 are defined, namely 'Bootstrapping' being pre-provisioned or device/server initiated; 'Registration' to register the device and its objects; 'Object/Resource Access' to enable server 4 access to an object 22 or resource 24; and 'reporting' for notifications with new resource 24 values. FIG. 2B illustratively shows different objects 22 provided on the device 2.

The protocol stack has transfer protocol, which may for example be Constrained Application Protocol (CoAP) or may be HTTP, but any suitable transfer protocol may be used.

The LWM2M architecture 20 uses a security protocol(s) to establish a communications path or channel for providing secure communications between device 2 and server 4 for data/payloads. The security protocols may, for example comprise Transport Layer Security/Datagram Transport Layer Security (TLS/DTLS), whereby TLS/DTLS is used to provide a secure channel between the LWM2M server 4 and the device 2 whereby TLS/DTLS security modes include both pre-shared key and public key technology. The data (e.g. application data) protected by TLS/DTLS may be encoded as plain text, binary TLV, JSON, CBOR, or any other data exchange format suitable for use with IoT deployments.

It will be understood that the devices 2 may be remotely managed by, for example, M2M application developer 26, using, for example, a web application service 28 and/or a device management application 30 as part of service 6.

Referring to FIG. 2B, each piece of data or information made available by the device 2 is a resource 24, whereby a resource 24 is data that can be read, written or executed.

The resources 24 are further logically organized into objects 22. Each device 2 can have any number of resources 24, each of which belongs to an object 22. Each device 2 can have any number of objects 22.

As an example, a security object contains resources used to enable secure communications between device 2 and servers 4. Such resources may include connection data such as credential data. The resources may be provisioned at manufacture (e.g. during a factory bootstrapping process) or during a registration process with an operator.

The credential data may include certificates (e.g. X.509 certificates), trust anchors, pre-shared or raw public keys, and identifiers (e.g. direct or indirect identifiers) to identify a device (e.g. a server) or service, whereby the device 2 uses the server identifiers to register therewith. The credential data can be input to a TLS/DTLS security protocol to establish a secure communication path.

Trust anchors are certificates provisioned to the client and therefore trusted by the clients. These trust anchors are typically certificate authority (CA) certificates but they may also be pinned, end entity certificates.

Certificates require some form of identifier which may be used for verification purposes (e.g. to verify a certificate received from a remote device according to the identifier matching algorithm). As an example, when a device interacts with a remote device (e.g. a server) in order to authenticate it then the algorithm may require two identifiers to match, namely the reference identifier (in the certificate stored on the device) needs to match the presented identifier (received from the remote resource). The detailed process of certificate parsing is described in RFC 5280.

When the identifier requires name resolution (hereinafter "an indirect identifier"), a name resolution service, such as DNS, may be used to find the corresponding address. However, when a device is unable to process the indirect identifier, for example when located in a residential environment without access to a public or private name resolution service, then the device would not be capable of locating another device using an indirect identifier, and could not establish communications therewith.

Indirect identifiers include, a fully qualified domain name (FQDN), a Uniform Resource Locator (URL)), a Uniform Resource Indicator (URI) or a Uniform Resource Name (URN), although this is not an exhaustive list.

When the provisioned identifier does not require name resolution (hereinafter "a direct identifier") such as an IP address (e.g. IPv4 or IPv6 address) the device can reach the address using the direct identifier.

Although not shown in FIG. 2A, further objects for device management purposes may include:
a firmware object containing all the resources used for firmware update purposes;
a server object defining data and functions related to the servers 4;
an access control object defining for each of several permitted servers 4 the access rights the servers 4 have for each object 22 on the device 2;
a device object to detailing resources on the device 2, for example, as related to device specific information whereby the device object allows remote retrieval of device information such as manufacturer, model, power information, free memory and error information. Furthermore the device object provides a resource for initiation of a remote reboot or factory reset;
a location object grouping those resources that provide information about the current location of the device 2;
a connectivity object grouping together resources on the device 2 that assist in monitoring the status of a network connection; and
a connection statistics object grouping together resources on the device 2 that hold statistical information about an existing network connection.

As will be appreciated by a person skilled in the art, the objects and resources required by device 2 may be provisioned thereon, for example during a bootstrapping process via an apparatus such as a bootstrap server 32, or via an 'out-of-band' process, which uses a non-Wi-Fi medium to provision the information on the device 2. Out-of-band provisioning can be wired by way of a USB interface for example. Alternatively, out-of-band provisioning can be wireless, for example, using a Near Field Communication (NFC) radio, Bluetooth® or BLE.

FIG. 3A shows a deployment scenario 33, whereby the device 2 is in communication range of the server 4 and the bootstrap server 32 according to an example; and FIG. 3B shows a communication sequence between the bootstrap server 32, device 2 and server 4. A bootstrap server 32 is used to provision the device 2 with the required objects and resources the device 2 uses to communicate with server 4 and/or other devices (not shown).

The bootstrap server 32 may comprise a database 34 of all devices with which it is registered, which details the permissions any particular device should have, and which details the permissions another device (e.g. endpoint device or server) has when communicating with the particular device.

The bootstrap server 32 may also comprise credential data 36 to be provisioned on the devices as part of the bootstrapping process.

Referring to FIG. 3A & FIG. 3B, the device 2 is provisioned with a security object 38 containing a "LWM2M Server URI" resource (S100), whereby, for the present example, the resource is a server certificate containing an IP address for the server 2 as a server certificate identifier. The device 2 communicates with the LWM2M server 4 using the IP address in the certificate and requesting access to a particular service (S102). The LWM2M server 4, on verifying that the device 2 is authorised to access the service, returns a server certificate containing an IP address of the server as a server certificate identifier (S104). The server 4 verifies that the device 2 is authorised to access the service by verifying a signature on the request signed with the device's private key (Priv(D)) and comparing it with an access control list.

The device 2 then validates the received server certificate (S106), by verifying that the IP address in the received server certificate identifier matches the IP address in the server certificate provisioned thereon.

When the IP addresses of the respective certificates match, then the device 2 returns a device-server certificate (not shown), whereby the device-server certificate is specific to the device 2 and server 4, and may be provisioned on the device 2 during the bootstrap process. The device-server certificate identifies a relationship between the device and the server that it is seeking to establish a connection with. Such a relationship may be verified using information in the certificate, such as device and server identifiers, or cryptographic keys. For example, the device-server certificate may comprise a verifiable trust anchor.

In the present illustrative example, the device-server certificate can be validated by the server 2, and when validation is successful a communication path for providing secure communications between device 2 and server 4 is established, such that the device 2 securely interacts with the server 4 and vice versa.

However, whilst the device 2 is capable of establishing secure communications with the server 4 using IP addresses to reach the server, the IP addresses in the various certificates may change, and provisioning updated certificates on devices may be inconvenient, incur costs and will take time.

Similarly, if the device 2 had a certificate with an indirect identifier (e.g. FQDN, URI, URL) to identify the server 2, it would require DNS to resolve the indirect identifier to an IP address or it would have no way to construct an IP packet to establish communication with the server 4. However, some networks do not have a DNS (e.g. a private network), and, therefore, a device relying on an indirect identifier to address the server 4 in a such network would not be capable of addressing the server 4.

FIG. 4A shows a system 41 comprising the device 2, having security object 40, in communication with server 4 and the bootstrap server 32 according to an embodiment; FIG. 4B shows resources 42, 44, 46 of object 40 provisioned on the device 2; and FIG. 4C shows a communication sequence between the bootstrap server 32, device 2 and server 4 of the system 41.

In FIG. 4A, the device 2 is depicted as being provisioned with a security object 40 from the bootstrap server 32, although the security object 40 could also be provisioned out-of-band.

In the present example, security object 40 includes a first resource 42, comprising a first server identifier for the server to which the device 2 is to connect. In the present example, the first resource comprises a certificate (e.g. an X.509 certificate), and the first server identifier comprises an indirect identifier (e.g. a fully qualified domain name (FQDN)) although the first server identifier 42 is not limited in this respect and may additionally or alternatively comprise a direct identifier. The first server identifier can have an associated namespace identifier.

The security object 40 further includes a second resource 44 which comprises a second server identifier 44 for the server to which the device 2 is to connect. The second server identifier 44 may be used as connection data to establishing a communications path for secure communications.

For example, the second server identifier, or part thereof or associated therewith, may be included in the Server Name Indication (SNI) field during a TLS/DTLS handshake as discussed in greater detail below. In the present example, the second server identifier comprises an indirect identifier (e.g. a fully qualified domain name (FQDN)) although the second resource 44 is not limited in this respect and may additionally or alternatively comprise a direct identifier. The second server identifier can have an associated namespace identifier.

The security object 40 includes a third resource 46, hereafter "reachability resource," which includes a one or more third server identifiers for the server to which the device 2 is to connect. The third server identifier may comprise any suitable direct identifier such as an IP address in IPv4, IPv6, a media access control MAC address, short message service (SMS) address or the third server identifier may comprise an indirect identifier. The third server identifier can also have an associated namespace, for example, to distinguish between different types of identifiers that can be included in the reachability resource e.g. to distinguish between an IPv4, IPv6 address and an SMS address (which can be an E164 number). Identifiers from the different namespaces can be used within one reachability resource. For example, one namespace could have an IP and an SMS address included, which allows the device to establish secure communications with a server over IP using IP addresses or to establish secure communications with same server over SMS without having to be re-provisioned.

The security object 40 includes a further resource 48, hereafter "device-server resource", which in the present illustrative example comprises a device-server certificate. As above, the device-server certificate identifies a relationship between the device and the server that it is seeking to connect to. Such a relationship may be verified using information in the certificate, such as device and server identifiers. Additionally or alternatively, a device-server certificate may provide a certification path to a trusted party, which may be verified by corresponding certificates or keys on the respective devices which receives it.

The security object 40 is configured for a particular server to which the device 2 is to connect (e.g. server (which includes another device acting as a server)/bootstrap server). However, a device 2 may have a plurality of security objects 40 to enable it communicate with a plurality of servers, whereby the device 2 selects the appropriate address to connect to the server.

Furthermore, although a security object is configured for a particular server, the reachability resource may include multiple server identifiers to address servers that may be addressed using multiple IP addresses (e.g. multi-homed hosts as depicted by Server: ipA; and Server: ipB in server 4 of FIG. 4A).

Referring to FIG. 4C, the device 2 is provisioned with a security object 40 comprising first to fourth resources 42, 44, 46, 48 (S150) as described in detail above.

The device 2 uses the third server identifier in the reachability resource to address the server 4 and uses the second server identifier as connection data to establish a secure communications path, whereby in the following examples the device 2 includes the second server identifier, or a portion thereof, in the SNI field for a TLS/DTLS handshake (S152).

The security object 40 may define the type and format of the connection data to be used in any communications with the server. For example, for a TLS/DTLS handshake, the certificate in the first resource may specify the particular algorithm which defines how the device should to fill the SNI field correctly.

As part of the handshake, the server 4 returns connection data which includes credential data to be validated by the device 2 (S154), whereby, in the present example, the credential data from the server comprises a server certificate, the server certificate having a server identifier. The server 4 may sign the certificate using its private key (Priv(S)) as further credential data. It will be appreciated that although the server 4 may provide access to a plurality of different services, the server 4 selects the appropriate server certificate corresponding to the data in the SNI field received from the device 2.

In the present illustrative example, the server certificate (e.g. an X.509 certificate) comprises an FQDN to the server as the server identifier, although the server identifier is not limited to being an FQDN.

The device 2 then validates the connection data received from the server 4 (S156), whereby for the present illustrative example, the device 2 checks that the server identifier in the received server certificate matches the second server identifier provided in the SNI sent to the server 4, and/or by validating the signature on the server certificate received from the server 4 using the server certificate of the first resource 42.

When validation fails because, for example, the two server identifiers do not match, the signature on the received server certificate cannot be validated, or because one or both of the received or provisioned server certificates have expired, then the device 2 can take a security action which may include: restarting the handshake procedure (as at S152).

Additionally or alternatively, such a security action may be that the device 2 aborts the communication, whereby the device 2 may communicate with a bootstrap server to request an updated security object having updated resources or alert a registered owner of the device 2 (e.g. registered operator or user) that the, or a threshold number of, communication attempts failed (e.g. via a visual or audible alert) such that the owner can provision the device 2 with an updated security object.

However, when validation of the connection data received from the server 4 is successful, whereby for the present illustrative example, if the two server identifiers match then the device 2 continues with the handshake procedure.

For the present illustrative example, the device 2 may transmit connection data (S158) such as an appropriate certificate for use with the server 4, whereby in the present example, the device transmits the device-server certificate 48 which is specific for use between the device 2 and server 4 as may be indicated by one or more device-server identifiers therein.

The server will validate (S160) the connection data received from the device 2, and if validation is successful then secure communications may be established between the device 2 and server 4 such that the device can access the service (S162).

When validation by the server 4 is not successful, the server 4 may perform a security action, whereby such a security action may be that the server 4 aborts the handshake process.

Additionally or alternatively, the security action may be that the server 4 communicates with the device's bootstrap server 32, to request an updated security object 40 having updated resources be provisioned on the device. Additionally or alternatively, the security action may be that the server communicates with the device's registered owner (e.g. via email or SMS) that a communication attempt(s) failed, such that the owner can arrange to provision the device with an updated security object. The owner details may be provided in the connection data from the device 2, for example in the certificate of the first resource.

It may be necessary to update the security object(s) on a device after a period of time or after an event. For example, such an update may be required when a particular certificate expires or when a server with which the security object is associated is removed from the network (e.g. due to replacement) or when a different technology is used for communication between the device and server (e.g. changing from IPv4 to GSM). Such provisioning may be performed using the bootstrap server 32 in a server initiated bootstrapping process, whereby the bootstrap server is aware of necessary update and communicates with the individual device to provision the updated security object. In other examples, such provisioning may be performed out-of-band.

By addressing the servers using a direct identifier (i.e. in the reachability resource) and using the server identifier in the second resource as the SNI, there is no requirement for the server or the device to have name resolution capabilities, and, therefore, the secure communications between the device and server can be established independent of any name resolution infrastructure (e.g. DNS).

Furthermore, whilst the certificates described in the illustrative examples provide direct trust between the device and server, it will be appreciated that certificates which provide indirect trust may also be used, whereby the certificates provide a chain of trust via a certification path from the server 4 to a party trusted by the device 2 or from the device 2 to a party trusted by the server 4, whereby the chain of trust may be verified using one or more public keys provided on the respective devices.

Although the present illustrative examples describe the device 2 connecting to the server 4 using a TLS/DTLS handshake, the claims are not limited in this respect.

Furthermore, although the present illustrative examples depict the server 4 and bootstrap server 32 as being discrete devices, it will be appreciated that the claims are not limited in this respect, and the server 4 and bootstrap server 32 may be part of the same device or same service (e.g. as part of a cloud based infrastructure).

Figure 5B:
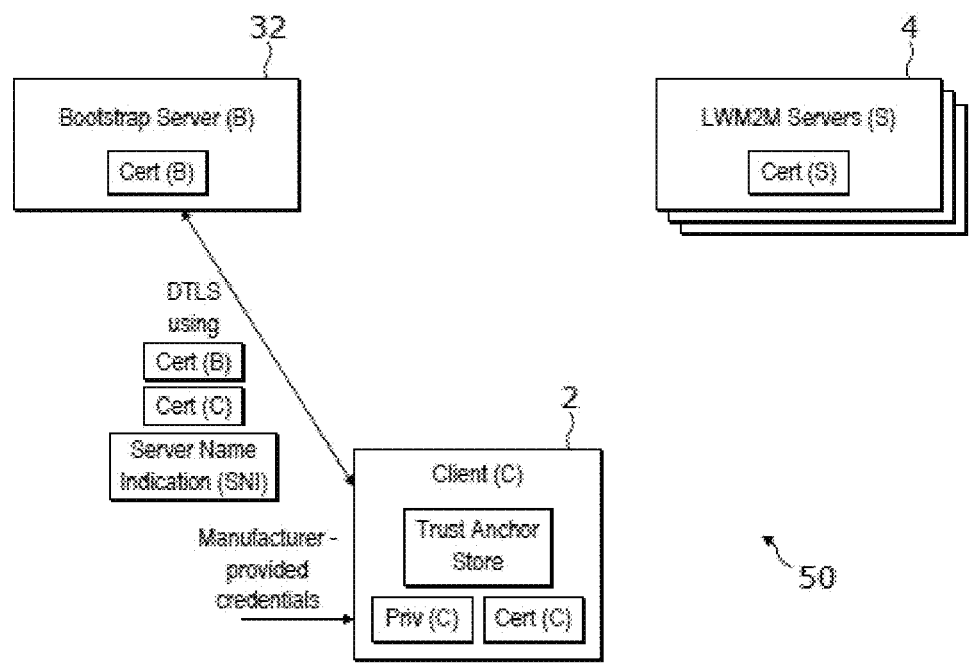
Figure 5C:
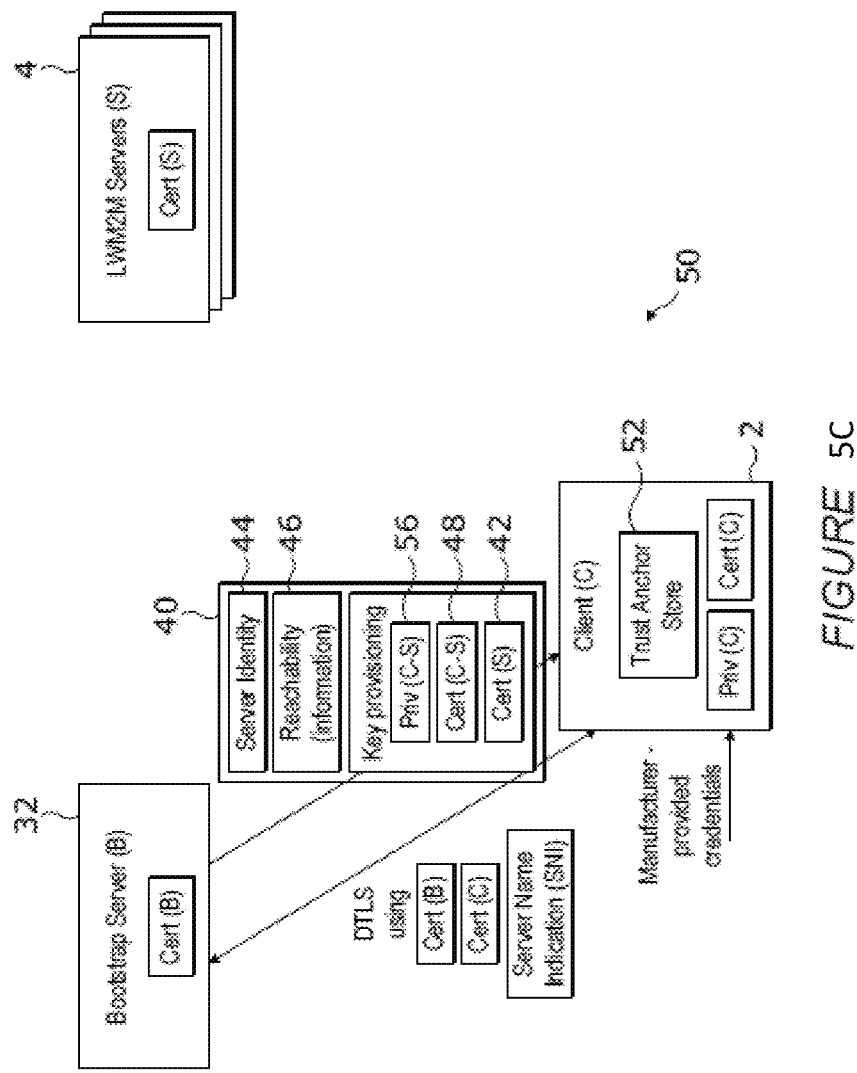
Figure 5D:
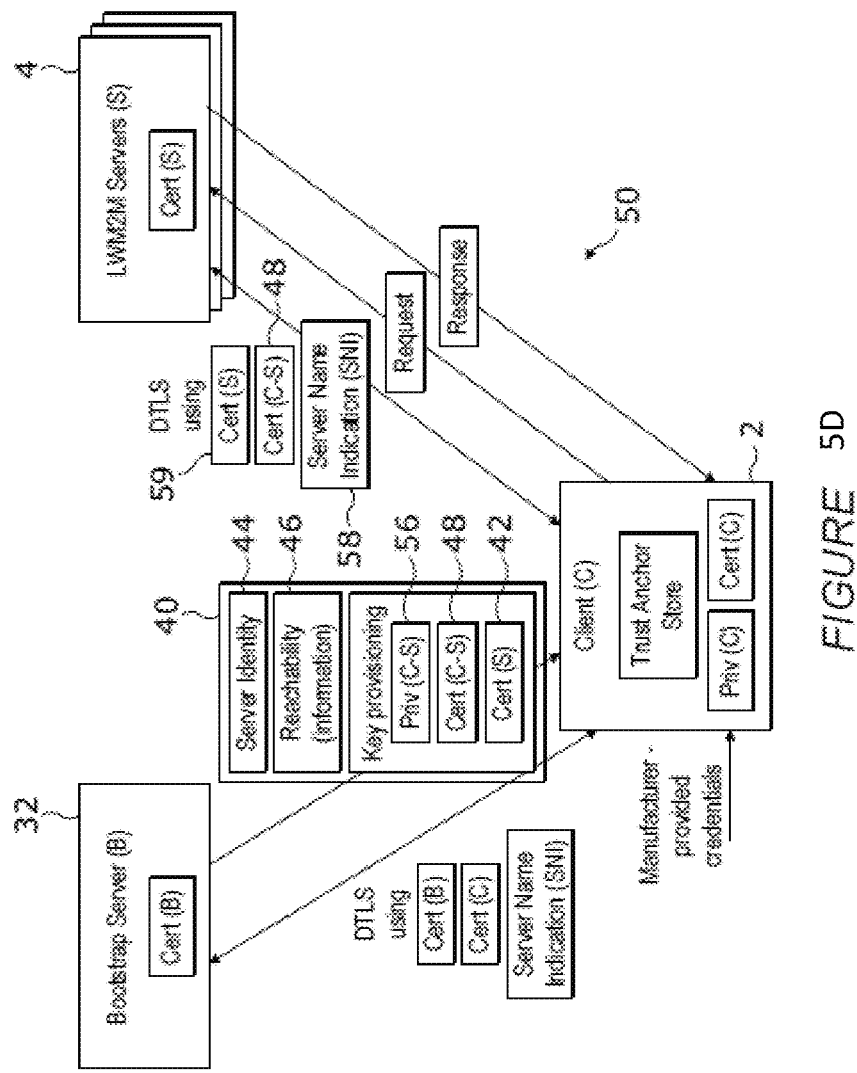
Figure 6:
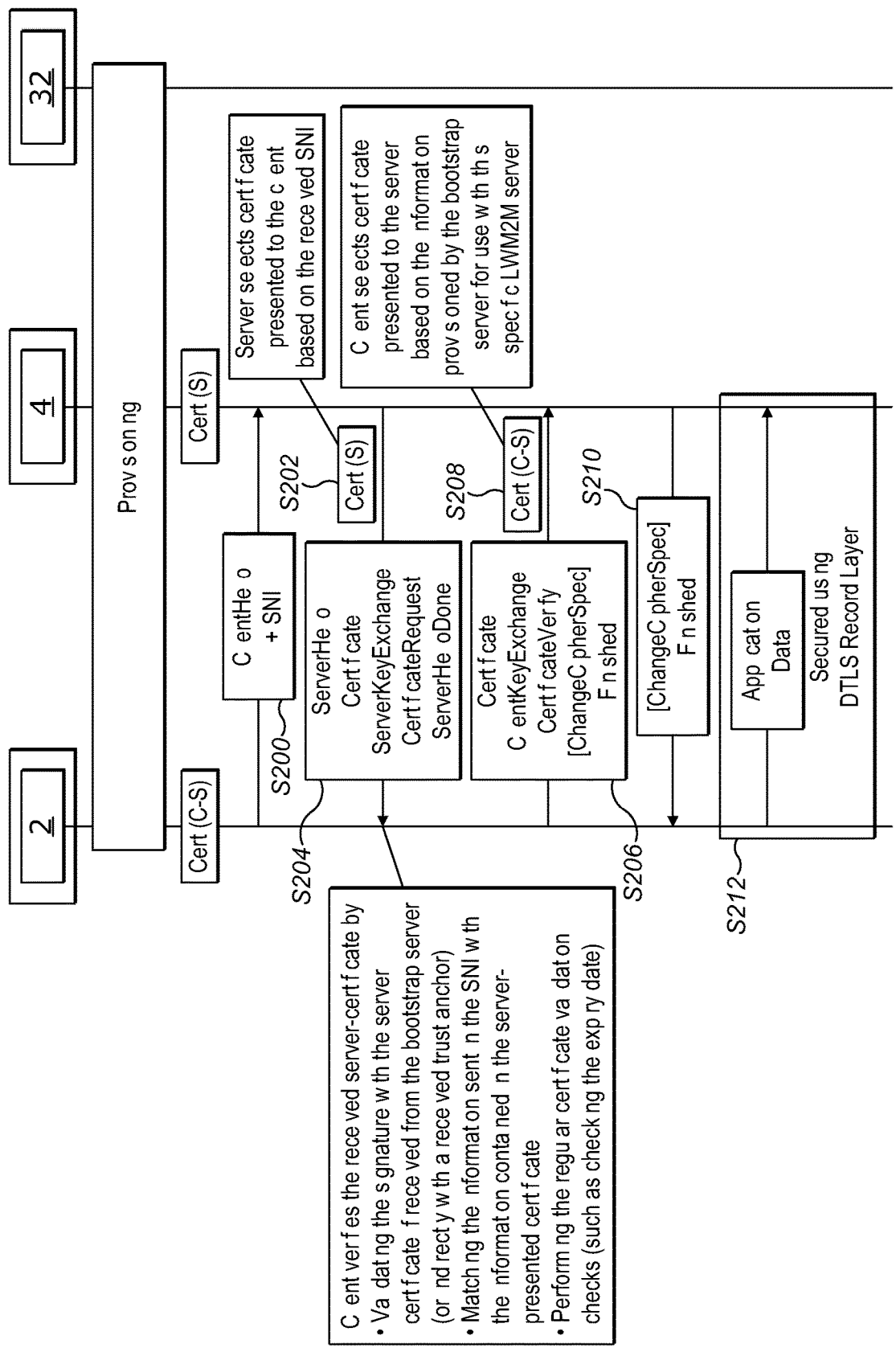
FIG. 6 shows a communication sequence between the device, server and bootstrap server of FIG. 5A, FIG. 5B, FIG. 5C and FIG. 5D.

FIGS. 5A-D show an example lifecycle of device 2 in system 50, from manufacture to establishing a communications path for secure communications with server 4 according to an embodiment; and FIG. 6 shows a communication sequence between the device 2, server 4 and bootstrap server 32 in the system 50 according to an embodiment.

Referring to FIG. 5A shows the device 2, referred to as "client", but this is not a limiting term. The device 2 is provisioned with credential data, such as a cryptographic keys and certificates, as part of a factory bootstrap process (e.g. at manufacture). Without such credential data it cannot establish trust with another device.

In the present illustrative example, the device 2 is provided with a device private cryptographic key Priv(C) and a device certificate Cert (C). Other data may also be provisioned but not shown. For example, the device 2 may be provisioned with connection data, such as a bootstrap server cert (e.g. IP address) and an SNI parameter for the bootstrap server 32 to allow it to establish secure communications with the bootstrap server 32 as depicted at FIG. 5B, whereby the device may search for the bootstrap server and connect therewith (e.g. when first powered up). Such credential data may be provisioned on the device as part of the factory bootstrap or as part of a configuration or registration process by the owner.

As depicted in FIG. 5C, the bootstrap server 32 provisions the device 2 with security object 40, comprising different resources using DTLS, whereby, as above, the security object includes the first resource 42 comprising the server certificate (Cert(S)) having the first server identifier; the second resource 44 comprising the second server identifier; and third, reachability, resource 46 comprising the third server identifier.

The security object also includes device-server resource comprising device-server certificate (Cert(C-S)) 48 and further includes a private device-server cryptographic key (Priv(C-S)) 56.

The resources may be stored in memory on the device 2, and may, for example, be stored in the trust anchor store 52.

In the present illustrative example, the server certificate (Cert(S)) is stored in a trust anchor store 52, which may comprise a secure portion of non-volatile memory on the device 2, where credential data used to validate the credential data of other devices is stored.

The server 4 is capable of validating the device-server certificate (Cert(C-S)) 48. For example, the server 4 may receive corresponding keys/certificates from an operator of the device 2 (e.g. as part of a registration process therewith). In the present example, such keys/certificates provided to the server 4 may include a public key for the device-server certificate (Cert(C-S)) 48.

As depicted in FIG. 5D, and referring to FIG. 6, the device 2 initiates a TLS/DTLS handshake by sending a first communication to the server S200 comprising connection data 'Clienthello+SNI', whereby the SNI information 58 is based on the server identifier in the second resource 44 on the device 2, and whereby the server 4 is addressed using the server identifier in the reachability resource 46.

The server 4 selects the appropriate server certificate in response to the SNI in the connection data at S200, and at S202, returns a communication comprising connection data in the form of a server certificate (Cert(S)) 59, and whereby the server 4 cryptographically signs the communication using its private key (Priv(S)) to provide further credential data in the connection data.

On receiving the communication comprising the connection data at S204, the device 2 validates the credential data therein, by validating the signature using the server certificate (Cert (S)) 42 provisioned thereon; matching the SNI information sent at S200 with information contained in the server certificate 59 received from the server 4.

When the validation is not successful the device 2 can perform a security action as described with reference to FIGS. 4A-4C and FIG. 7.

When the validation by the device 2 is successful, the device 2 proceeds with the TLS/DTLS handshake and sends a communication comprising connection data to the server 4 (S206) which includes credential data comprising the device-server certificate (Cert(C-S)) 48, and may sign the communication using the private device-server cryptographic key (Priv(C-S)) 56 provisioned thereon to provide further credential data in the connection data.

On receiving the communication comprising the connection data (S208), the server 4 validates the device-server certificate (Cert(C-S)) 48 by, for example, validating the signature (e.g. using an appropriate key or certificate provisioned thereon or which is accessible in the server's 4 hosting environment);

When the validation is not successful, the server 4 can perform a security action as described with reference to FIGS. 4A-4C and FIG. 7.

When the validation by the server 4 is successful, the server 4 proceeds with the TLS/DTLS handshake and, at S210 sends a communication to the server 4, and whereby the device 2 is in secure communication with the server 4 and can access a desired service, whereby in the present illustrative example, the communications between the device 2 and server 4 are secured under DTLS.

Figure 7:
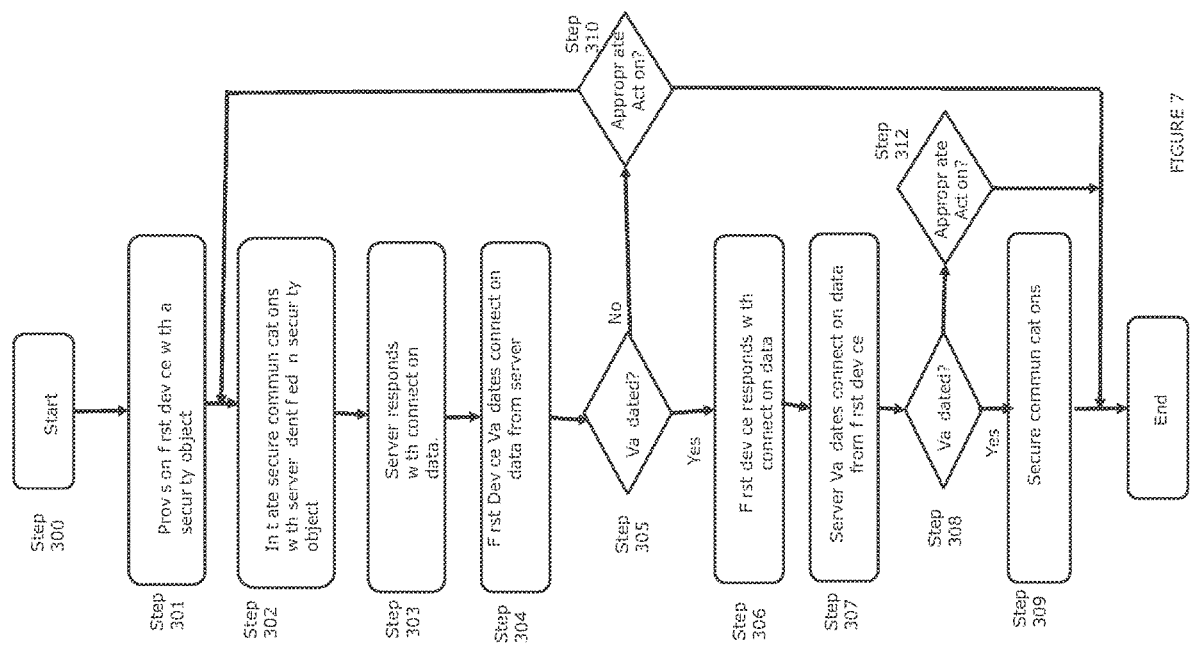
FIG. 7 shows a flow diagram of general steps to enable a first device to securely communicate with a second device according to an embodiment.

FIG. 7 shows a flow diagram of general steps to enable a first device to securely communicate with a second device according to an embodiment. In the present example, the second device is described as a server, and it will be appreciated the second device may be any device which is capable of functioning as a server to allow the first device to access the remote service.

According to FIG. 7, the process begins at Step 300

At Step 301, the device is provisioned with a security object, which includes a first resource comprising a first server identifier for the server to which the first device is to connect, a second resource comprising a second server identifier for the server to which the first device is to connect and a third, reachability, resource comprising a third server identifier for the server to which the first device is to connect. In the present example, the first and second server identifiers are FQDNs, whilst the third server identifier comprises a direct identifier, described herein as an IP address, it is not limited thereto.

At Step 302 the first device initiates a secure communication with the server. In the present example, the initiating comprises initiating a TLS/DTLS handshake, using the third server identifier to address the server and using the second server identifier as an SNI in the SNI field.

At Step 303 the server responds to the first device as part of the handshake, sending connection data which includes a server certificate having a server identifier, whereby the server selects the appropriate server certificate corresponding to the SNI parameter received from the first device. In the present example, the server signs the server certificate with an appropriate cryptographic key, such as its private key, whereby the signature is further credential data in the connection data.

At Step 304, the first device validates the connection data received from the server, whereby the device validates the received server certificate by checking that the server identifier therein matches the second server identifier provided in the SNI sent to the server, and performing other checks, such as verifying that the certificate has not expired.

At step 305, when the credential data from the server is validated, the first device continues with the handshake at step 306 sending connection data to the server for validation thereby. The first device connection data may include a device-server certificate provisioned thereon (e.g. as part of the security object at step 301). The first device may also sign the device-server certificate or the communication itself with the its private key (Priv(FD)) as further credential data in the connection data.

At step 305, when the connection data is not validated, or if no communication is returned, the first device, at step 310, takes a security action, which may be to attempt to initiate the secure communications again as at Step 302.

Additionally or alternatively, such a security action may be that the first device aborts the communication, whereby the process ends. In some examples, the first device 2 may communicate with a bootstrap server to request an updated security object having updated resources or alert a registered owner of the first device that the, or a threshold number of, communication attempts failed (e.g. via a visual or audible alert) such that the owner can arrange to provision the first device with an updated security object.

At step 307, the server validates the connection data received from the first device, for example by checking that the device-certificate matches a corresponding certificate available thereto and, for example, checking the expiry date of the received device-server certificate is valid and validating the signature on the received certificate or communication using an appropriate key.

At step 308, when the credential data is validated, the handshake will complete and at Step 309 a communications path for secure communications is established using TLS/DTSL and the process ends. With the secure communications path established, the first device can access the services via the server.

At step 308, when the credential data is not validated, the server, at step 312, takes a security action. Such a security action may be that the server aborts the handshake process, whereby the process ends.

In some examples, the security action may be that the server communicates with the device's bootstrap server, to request an updated security object having updated resources be provisioned on the device. Additionally or alternatively, the security action may be that the server informs the device's owner (e.g. via email or SMS) that a communication attempt(s) failed, such that the owner can arrange to provision the first device with an updated security object. Additionally or alternatively, when a threshold number of attempts to unsuccessful attempts to connect from a particular device is exceeded, the server may ignore any further requests to connect from that particular device and/or may update a device blacklist such that other servers having access to the device blacklist may also ignore requests from that particular device.

By addressing the servers using a direct identifier (i.e. in the reachability resource) and using the server identifier in the second resource as the SNI, there is no requirement for the server or the device to have name resolution capabilities, and, therefore, the secure communications between the device and server can be established independent of any name resolution infrastructure (e.g. DNS).

Furthermore, as the certificates comprise indirect identifiers (such as FQDNs), the devices are not relying on static IP addresses for the verification. As such, it will be appreciated that certificates having indirect identifiers for have a reduced likelihood of being updated in comparison to certificates relying on direct identifiers.

Figure 8:
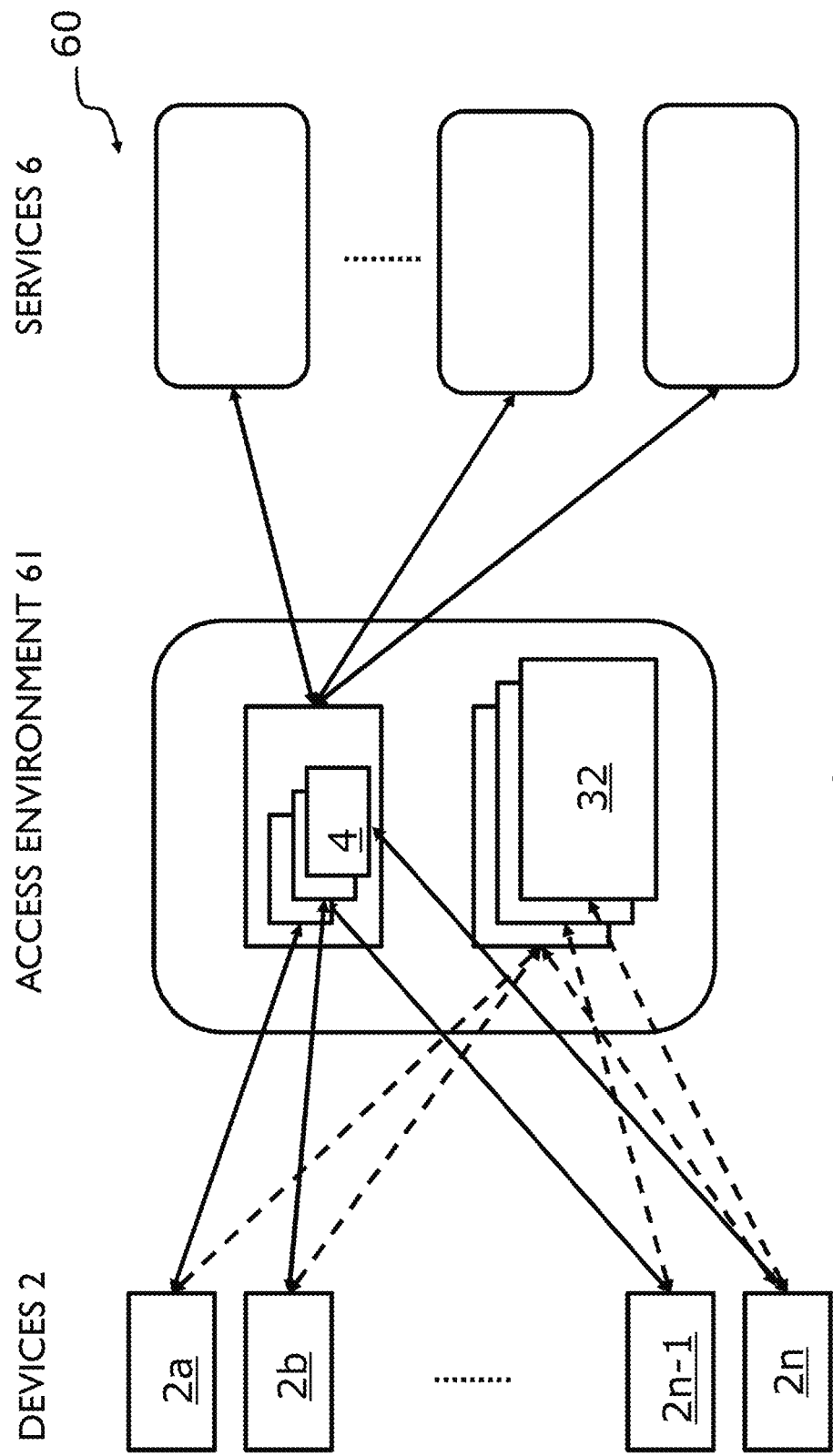
FIG. 8 shows a system comprising multiple devices 2a-2n, each operable to access multiple different services via an Access Environment platform according to an embodiment.

FIG. 8 shows a system 60 comprising multiple devices 2a-2n, each operable to access one or more services 6 via an Access Environment platform according to an embodiment.

The devices 2a-2n may be IoT devices, for example each running the same operating system. Such devices may be based on 32-bit ARM® Cortex®-M microcontrollers.

The Access Environment 61 includes infrastructure for enabling the devices 2a-2n to access services 6, whereby, in the present example, the Access Environment 61 comprises both the servers 4 which provide the devices 2a-2n with access to the different services 6 as described in the examples above, and the bootstrap servers 32 which provision the devices 2a-2n with different objects and resources for desired operation of the devices 2a-2n.

It will be seen that the devices 2a-2n may communicate with different bootstrap servers 32, and in some cases the devices 2a-2n may communicate with more than one bootstrap server 32 (e.g. as depicted by 2n in FIG. 8).

Furthermore, the devices 2a-2n may communicate with multiple servers 4, whereby, as described above, the devices may be provisioned with a security object (not shown in FIG. 8) specific for each server 4.

Furthermore still, each server 4 in the access environment 61 may communicate with multiple services 6, which may be part of a private cloud or public cloud environment, and which may comprise different types of services such as, data storage & analytics services, management services and application services, although it will be appreciated that this list is not exhaustive. It will be appreciated that the one or more of the servers 4 in the access environment can be local to the device 2, such as in an enterprise network or even in a local network. Embodiments of the present techniques also provide a non-transitory data carrier carrying code which, when implemented on a processor, causes the processor to carry out the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier—such as a disk, microprocessor, CD- or DVD-ROM, programmed memory such as read-only memory (firmware), or on a data carrier such as an optical or electrical signal carrier. The code may be provided on a carrier such as a disk, a microprocessor, CD- or DVD-ROM, programmed memory such as non-volatile memory (e.g. Flash) or read-only memory (firmware). Code (and/or data) to implement embodiments of the techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

Computer program code for carrying out operations for the above-described techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from the any inventive concept as defined in the appended claims.

The invention claimed is:

1. A method of establishing a communications path between a client device and a server comprising:
  receiving, at the client device from a bootstrap server, data, the data comprising:
    a first resource having a first identifier for a server, remote from the client device;
    a second resource having a second identifier for the server;
  generating, at the client device, first connection data based on the second identifier wherein the first connection data comprises a Server Name Indication based on the second identifier;
  addressing the server with the first identifier to transmit, from the client device to the server, the first connection data;
  receiving, at the client device from the server in response to the first connection data, second connection data;
  validating, at the client device, the second connection data;

establishing the communications path between the client device and the server responsive to a valid second connection data.

2. The method of claim 1, wherein the data further comprises a third resource having a third identifier for the server.

3. The method of claim 2, wherein the second or third identifier comprises an indirect identifier.

4. The method of claim 2, wherein the third resource comprises a certificate that includes the third identifier.

5. The method of claim 2, wherein the data further comprises a fourth resource having a fourth identifier for identifying a relationship between the client device and the server.

6. The method of claim 5, further comprising:
transmitting the fourth identifier from the client device to the server responsive to validating the second connection data.

7. The method of claim 5, wherein the second connection data comprises a fifth identifier for the server.

8. The method of claim 7, wherein validating the second connection data comprises verifying that the second identifier corresponds to the fifth identifier.

9. The method of claim 7, wherein the second connection data comprises a certificate that includes the fifth identifier therein.

10. The method of claim 1, wherein the second connection data further comprises a cryptographic signature of the server.

11. The method of claim 10, wherein the data further comprises a third resource having a third identifier for the server and wherein validating the second connection data comprises verifying the cryptographic signature using the third resource.

12. The method of claim 1, wherein transmitting, from the client device to the server, the first connection data initiates a handshake sequence between the client device and the server.

13. The method of claim 12, wherein the handshake sequence is a TLS/DTLS handshake sequence.

14. The method of claim 1, wherein the communications path is secured under TLS/DTLS.

15. The method of claim 1, further comprising performing a security action at the client device responsive to invalidate the second connection data.

16. The method of claim 1, wherein receiving, at the client device, the data comprises one of:
receiving, at the client device from the bootstrap server, the data; and
receiving, at the client device in an out-of-band process, the data.

17. The method of claim 1, wherein the first identifier comprises a direct identifier.

18. A non-transitory data carrier carrying code which, when implemented on a processor, causes the processor to carry out a method of establishing a communications path between a client device and a server comprising:
receiving, at the client device, from a bootstrap server, data, the data comprising:
a first resource having a first identifier for a server remote from the client device;
a second resource having a second identifier for the server;
generating, at the client device, first connection data based on the second identifier, wherein the first connection data comprises a Server Name Indication based on the second identifier;
addressing the server with the first identifier to transmit, from the client device to the server, the first connection data;
receiving, at the client device from the server in response to the first connection data, second connection data;
validating, at the client device, the second connection data;
establishing the communications path between the client device and the server responsive to a valid second connection data.

19. A device comprising:
storage configured to store:
a first resource having a first identifier for identifying a remote server;
a second resource having a second identifier for identifying the remote server;
processing circuitry configured to generate first connection data based on the second identifier, wherein the first connection data comprises a Server Name Indication based on the second identifier;
communication circuitry for receiving the first resource and second resource from a bootstrap server and addressing the remote server with the first identifier and transmitting the first connection data to the remote server and for receiving second connection data from the remote server in response to the first connection data; and
wherein the processing circuitry is further configured to validate the second connection data and establish a communication path with the remote server responsive to a valid second connection data.

* * * * *